(12) United States Patent
Hu et al.

(10) Patent No.: US 6,778,266 B2
(45) Date of Patent: Aug. 17, 2004

(54) SEMICONDUCTOR WAFER TILT MONITORING ON SEMICONDUCTOR FABRICATION EQUIPMENT PLATE

(75) Inventors: Clark Hu, Taipei (TW); Hendrix Jeng, Hsin-Chu (TW); Bor Ping Jang, Hsin-Chu (TW)

(73) Assignee: Taiwan Semiconductor Manufacturing Co., Ltd, Hsin Chu (TW)

( * ) Notice: Subject to any disclaimer, the term of this patent is extended or adjusted under 35 U.S.C. 154(b) by 31 days.

(21) Appl. No.: 10/045,412

(22) Filed: Jan. 12, 2002

(65) Prior Publication Data

US 2003/0133100 A1 Jul. 17, 2003

(51) Int. Cl.[7] .............................................. G01B 11/26
(52) U.S. Cl. ..................................... 356/138; 356/139.1
(58) Field of Search .............................. 356/138, 139.1, 356/601, 602, 614, 615, 623, 399–401, 139.04; 250/559.29, 559.3, 559.31, 559.32, 559.37, 559.39

(56) References Cited

U.S. PATENT DOCUMENTS

| | | | | |
|---|---|---|---|---|
| 4,398,824 A | * | 8/1983 | Feldman et al. ............. 356/401 |
| 4,504,144 A | * | 3/1985 | Trost ........................... 356/150 |
| 5,436,721 A | * | 7/1995 | Pence et al. ................. 356/154 |
| 5,864,394 A | * | 1/1999 | Jordan et al. ............ 356/237.2 |
| 5,929,983 A | * | 7/1999 | Lu ............................... 356/138 |
| 5,991,005 A | * | 11/1999 | Horikawa et al. ............ 355/53 |
| 6,172,757 B1 | * | 1/2001 | Lee ............................... 356/399 |
| 6,449,029 B1 | * | 9/2002 | Fujimoto ...................... 355/53 |
| 6,507,405 B1 | * | 1/2003 | Grek et al. .................. 356/479 |
| 6,512,579 B2 | * | 1/2003 | Oomori et al. ........... 356/237.5 |
| 6,538,733 B2 | * | 3/2003 | Gaal et al. ................... 356/244 |
| 6,608,689 B1 | * | 8/2003 | Wei et al. .................... 356/630 |

* cited by examiner

*Primary Examiner*—Michael P. Stafira
(74) *Attorney, Agent, or Firm*—Tung & Associates

(57) ABSTRACT

Monitoring semiconductor wafer tilt, such as in conjunction with semiconductor fabrication equipment having a cooling and or a heating plate, is disclosed. A system for such monitoring includes one or more light sources and one or more light detectors. Each light source generates light that is reflected by the semiconductor wafer. Each light detector senses a detected light value of the light reflected by the semiconductor wafer. If the detected light value deviates from a normal value corresponding to no wafer tilt, then this indicates that the semiconductor wafer has tilted.

13 Claims, 4 Drawing Sheets

SEMICONDUCTOR WAFER TILT MONITORING ON SEMICONDUCTOR FABRICATION EQUIPMENT PLATE

FIELD OF THE INVENTION

This invention relates generally to semiconductor fabrication equipment, and more particularly to monitoring semiconductor wafer tilt on the plates of such equipment.

BACKGROUND OF THE INVENTION

The photolithographic process is one of the most important in semiconductor device fabrication. It transfers the designed pattern from a mask or reticle to photoresist that temporarily coats the wafer surface. Integrated track-stepper systems, which perform primer and photoresist coating, baking, alignment, exposure, and photoresist development process steps are housed in a photo bay. A stepper is the most commonly used tool to pattern the photoresist coated on the wafer surface, by exposing the photoresist with ultraviolet (UV) light or deep UV light to induce photochemical reactions. It is usually the most expensive tool in advance semiconductor fabrication foundries as well.

FIG. 1 shows an integrated track and stepper system 100, which is also known as a photocell in a foundry. The system 100 includes a loader and unloader 102, a track 102, and a stepper 106. A wafer 108 is loaded onto the loader and unloader 102, and then proceeds to a preparation chamber 110. It is cooled at the cool plate 112, and then photoresist is spun onto the wafer 108 at the spin coater 114. The wafer 108 is heated on the hot plate 116 to cure the photoresist, and then cooled again on the cool plate 118. The wafer 108 is moved to the stepper 106, where the desired photo image is exposed onto the photoresist on the wafer 108. The wafer 108 is again heated and cooled at the hot plate 120 and the cool plate 122, respectively. After development in the developer 124, the wafer 108 is heated and cooled at the hot plate 126 and the cool plate 128, respectively, and returns to the loader and unloader 102 for unloading.

In an advanced semiconductor fabrication foundry, the track and stepper system likely does not look like that of FIG. 1. Instead, a stacked track system is used, which has a much smaller footprint. This is achieved by stacking the hot plates and the cool plates instead of putting them on the same plane. Some systems also stack the spin coaters and development stations, to further reduce the footprint and reduce clean room space usage. An example of a stacked track system is the Clean Track Act 8 system that is available from Tokyo Electron, Ltd., of Tokyo, Japan, which is used with 200 mm semiconductor wafers.

FIG. 2 shows an example plate system 200 of one of the hot plates or the cool plates of FIG. 1, and that can also be found in more advanced track and stepper systems that stack the plates. A hot plate is also referred to as a heating plate, whereas a cool plate is also referred to as a cooling plate or a chilling plate. The plate system 200 includes the plate 202 itself, as well as wafer guides 204 and 206 between which the semiconductor wafer 108 is placed. The guides 204 and 206 serve to assist the track system in proper placement of the wafer 208 onto the plate 202, so that uniform heating or cooling is performed on the wafer 208.

Unfortunately, even with the presence of the guides 204 and 206, the semiconductor wafer 208 can become misaligned on the plate 202, such that it is tilted. This is shown in FIG. 3. In the system 200', which is the system 200 in which the wafer 208 has tilted, the wafer 208' is tiled. The wafer 208' is the wafer 208 as tilted. The tilting of the wafer 208' prevents uniform heating or cooling, since the wafer 208' is not properly placed on the plate 202. Tilting may be caused by the track arm not being able to reach the correct position on the plate 202 for positioning the wafer 208', among other causes. Semiconductor wafer tilt is problematic. It can cause abnormal photoresist thickness, due to non-uniform heating or cooling. The ability to control the size of features such as lines is also impaired due to the non-uniform heating or cooling. Ultimately, significant semiconductor wafer scrap may result, which can be costly to the semiconductor manufacturer.

Therefore, there is a need for monitoring semiconductor wafer tilt on plates of semiconductor fabrication equipment. More specifically, there is a need for monitoring such tilt on the hot and cool plates of track systems. Such monitoring should be able to allow for prevention of non-uniform heating or cooling, so that the problems associated with such non-uniformities are avoided. For these and other reasons, there is a need for the present invention.

SUMMARY OF THE INVENTION

The invention relates to monitoring semiconductor wafer tilt. A system for such monitoring includes one or more light sources and one or more light detectors. Each light source generates light that is reflected by the semiconductor wafer. Each light detector senses a detected light value of the light reflected by the semiconductor wafer. If the detected light value deviates from a normal value corresponding to no wafer tilt, then this indicates that the semiconductor wafer has tilted.

Embodiments of the invention provide for advantages over the prior art. Monitoring of semiconductor wafer tilt per the invention allows for prevention of non-uniform heating and cooling. As a result the problems associated with semiconductor wafer tilt are prevented, such as abnormal photoresist thickness, and the inability to control the size of features such as lines. Semiconductor wafer scrap is also reduced. Still other advantages, aspects, and embodiments of the invention will become apparent by reading the detailed description that follows, and by referring to the accompanying drawings.

DETAILED DESCRIPTION OF THE INVENTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
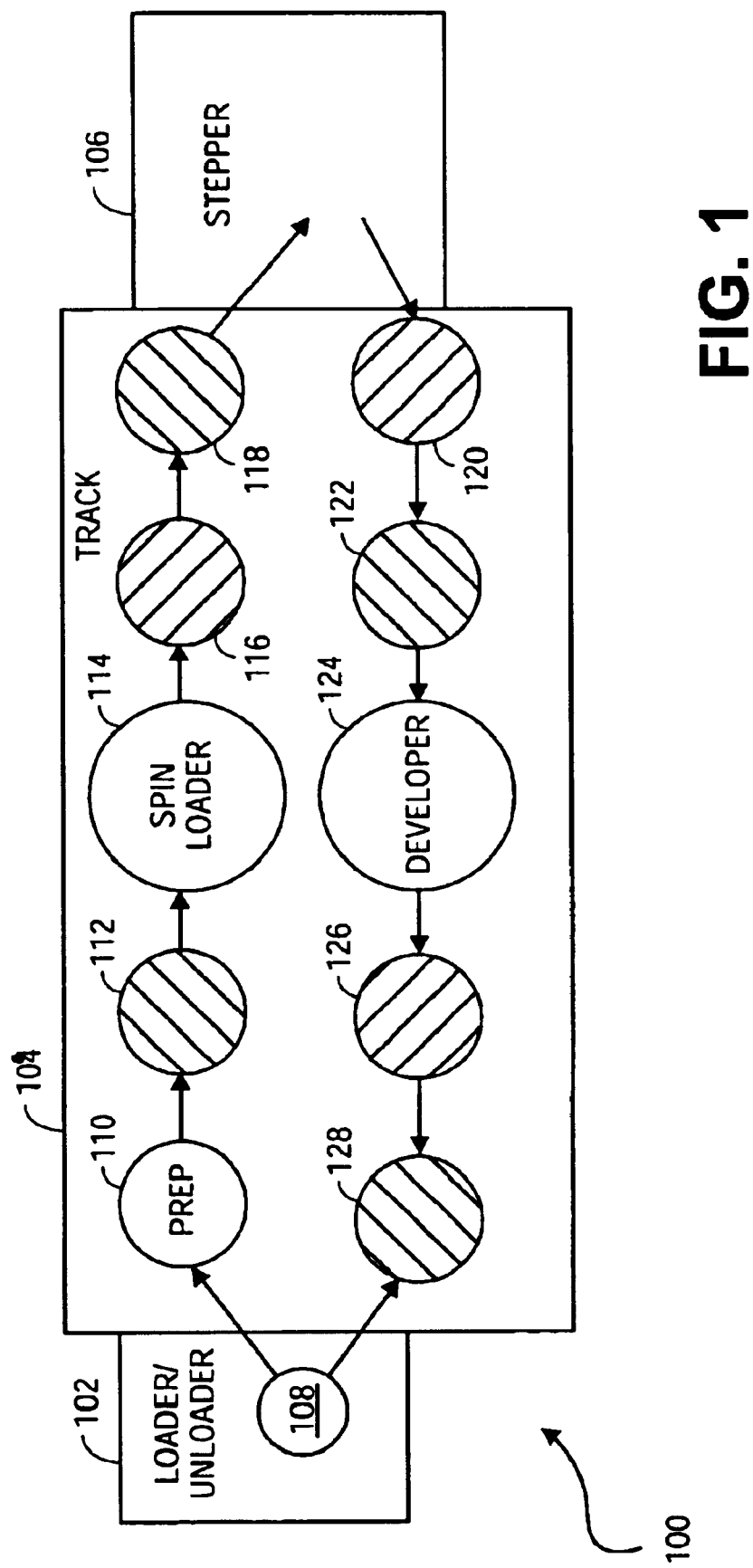
FIG. 1 is a diagram of a track and stepper system in conjunction with which semiconductor wafer tilt monitoring according to embodiments of the invention can be implemented.
Figure 2:
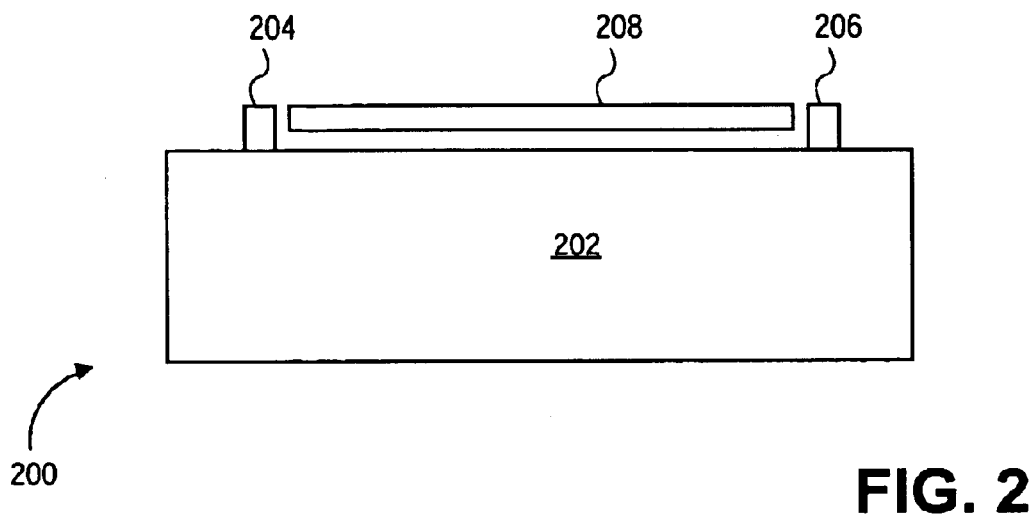
FIG. 2 is a diagram of a semiconductor fabrication equipment plate on which a semiconductor wafer has been positioned, where the semiconductor wafer exhibits no tilting.
Figure 3:
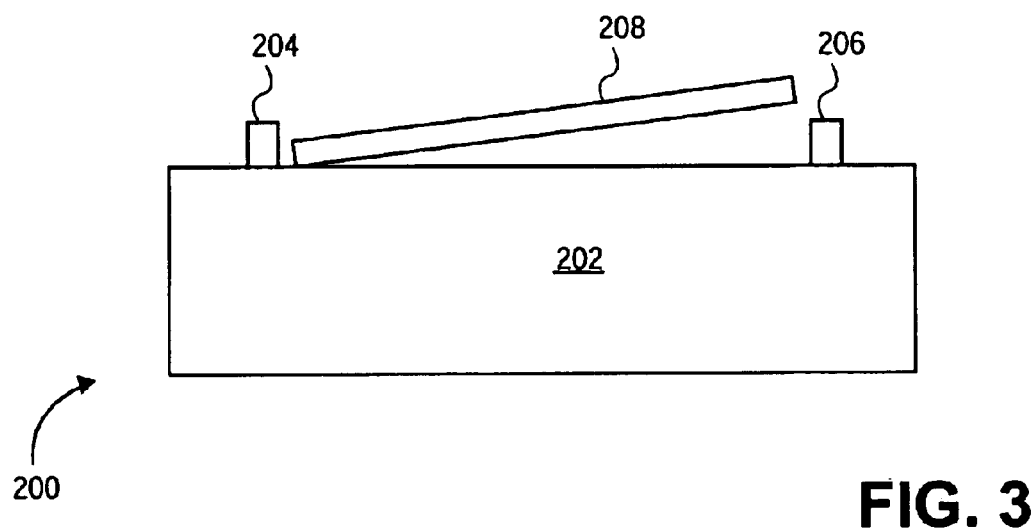
FIG. 3 is a diagram of a semiconductor fabrication equipment plate on which a semiconductor wafer has been positioned, but where the semiconductor wafer exhibits tilting.
Figure 4:
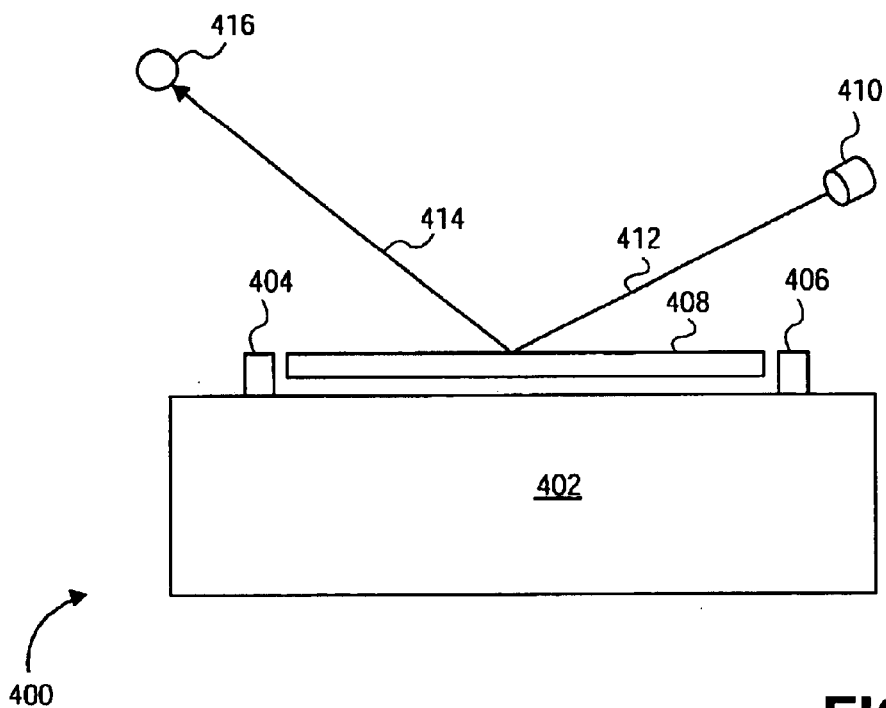
FIG. 4 is a diagram of a single-light source, single-light detector semiconductor wafer tilt monitoring system according to an embodiment of the invention, where a semiconductor wafer positioned within such a system exhibits no tilt.

FIG. 4 shows a system 400 for monitoring semiconductor wafer tilt. The system 400 includes a plate 402. The plate 402 can be a semiconductor fabrication equipment plate, such as a hot or a cool plate of a track system. However, the plate 402 can more generally be any type of plate, stage, or other apparatus on which a semiconductor wafer 408 can be positioned. The system 400 also includes guides 404 and 406, in between which the semiconductor wafer 408 is desirably positioned without tilt, as is indicated in FIG. 4.

A light source 410, which can be a visible light source, or a non-visible light source, emits a light beam 412, which can more generally be referred to as light. The light beam 412 reflects off the semiconductor wafer 408 as the reflected light beam 414. A light detector 416 senses the reflected light beam 414. The light detector 416 usually detects a normal value. The normal value, plus or minus a tolerance value, indicates that the semiconductor wafer 408 has not tilted. For instance, the normal value may be determined by ensuring that the wafer 408 has not tilted, and then determining the value sensed by the light detector 416. Subsequent sensing outside this normal value, plus or minus a tolerance value preferably, by the light detector 416 indicates that semiconductor wafer tilt has occurred.

Figure 5:
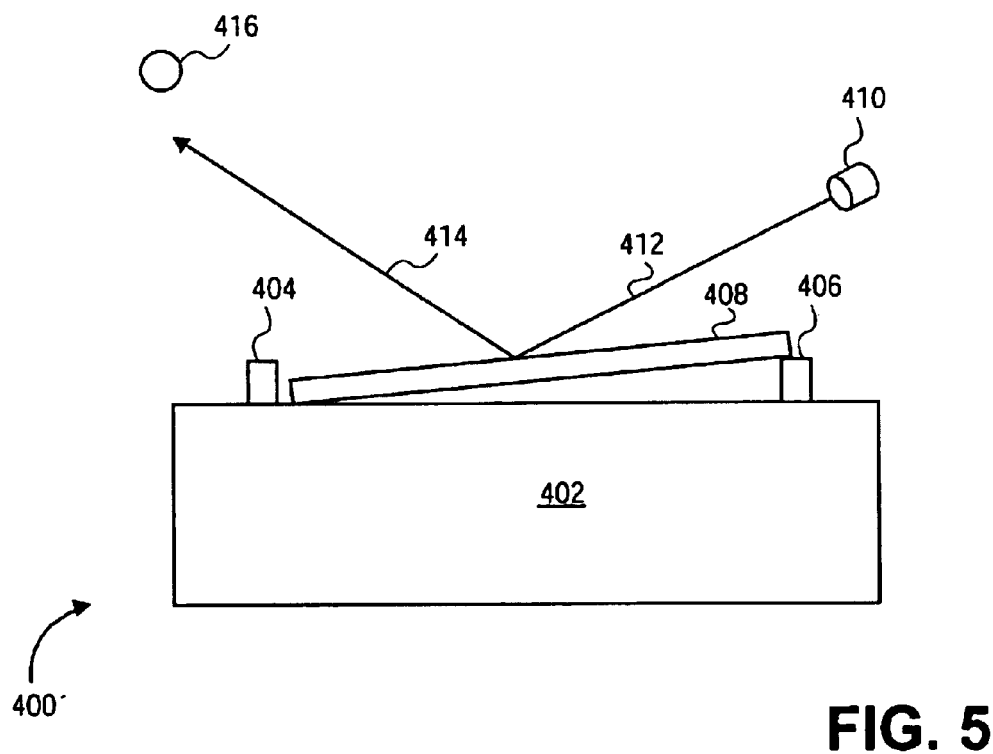
FIG. 5 is a diagram showing how the semiconductor wafer tilt monitoring system of FIG. 4 detects wafer tilt according to an embodiment of the invention, where a semiconductor wafer positioned within such a system exhibits its tilt.

FIG. 5 shows how the system 400 operates to detect semiconductor wafer tilt, as the system 400'. The semiconductor wafer 408 is tilted in FIG. 5. The light source 410 again generates a light beam 412, which is reflected off the semiconductor wafer 408 in FIG. 5 as the reflected light beam 414'. The reflected light beam 414' differs from the reflected light beam 414 of FIG. 4 in either angle and/or intensity, as a result of the tilting of the semiconductor wafer 408. Thus, as shown in FIG. 5, the reflected light beam 414' may not even hit the light detector 416 at all. That is, the light detector 416 more generally will sense a different light value of the reflected light beam 414' when the semiconductor wafer 408 is tilted. Assuming that this different value varies (deviates) from the normal value by more than a given tolerance value, then this is an indication that semiconductor wafer tilt has occurred.

Figure 6:
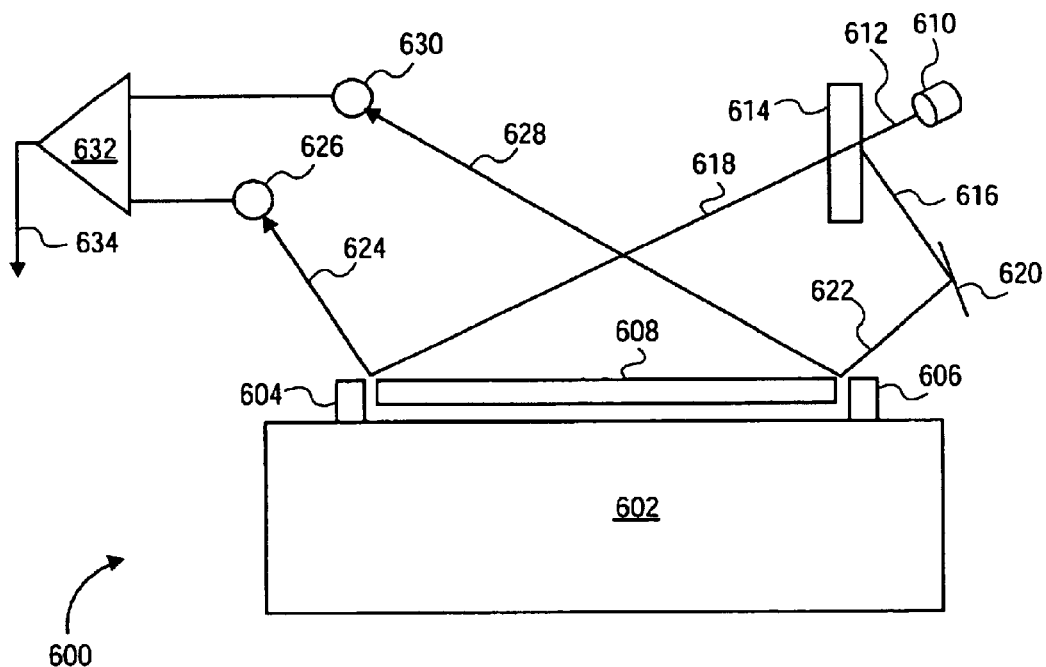
FIG. 6 is a diagram of a single-light source, dual-light detector semiconductor wafer tilt monitoring system according to an embodiment of the invention, which provides an alternative manner by which wafer tilt can be detected, as compared to the system of FIGS. 4 and 5.

FIG. 6 shows another system 600, according to an alternative embodiment of the invention, for monitoring semiconductor wafer tilt. Unlike the system 400 of FIG. 4, the system 600 has two light detectors 626 and 630, but still a single light source 610. A semiconductor wafer 608 is again positioned between two guides 604 and 606 on a plate 602. The light beam generated by the light source 610, which is more generally referred to as light, is split by a beam splitter 614 into the light beam 616 and the light beam 618. The beam splitter 614 may be a Brewster beam splitter. Alternatively, there may be two light sources, without need for a beam splitter and/or a beam bender 620, such that each of the two light sources directly generates a beam for reflection by the semiconductor wafer 608.

The light beam 616 has its path (direction) changed by the beam bender 620, as the light beam 622. Both the light beam 618 and the light beam 622 are reflected off a corner of the semiconductor wafer 608, as the reflected light beams 624 and 628, respectively. The reflected light beams 624 and 628 are sensed by the light detectors 626 and 630, respectively, as light values. Generally, if these light values deviate from a corresponding or other normal value by more than a tolerance value, then this indicates that semiconductor wafer tilt of the wafer 608 has occurred. More specifically, the light values are fed into a comparator 632, which generates an absolute difference of the values. Where the absolute difference deviates from a normal absolute difference by more than a tolerance value, then this indicates that semiconductor wafer tilt of the wafer 608 has occurred. For instance, the normal absolute difference may be zero.

Figure 7:
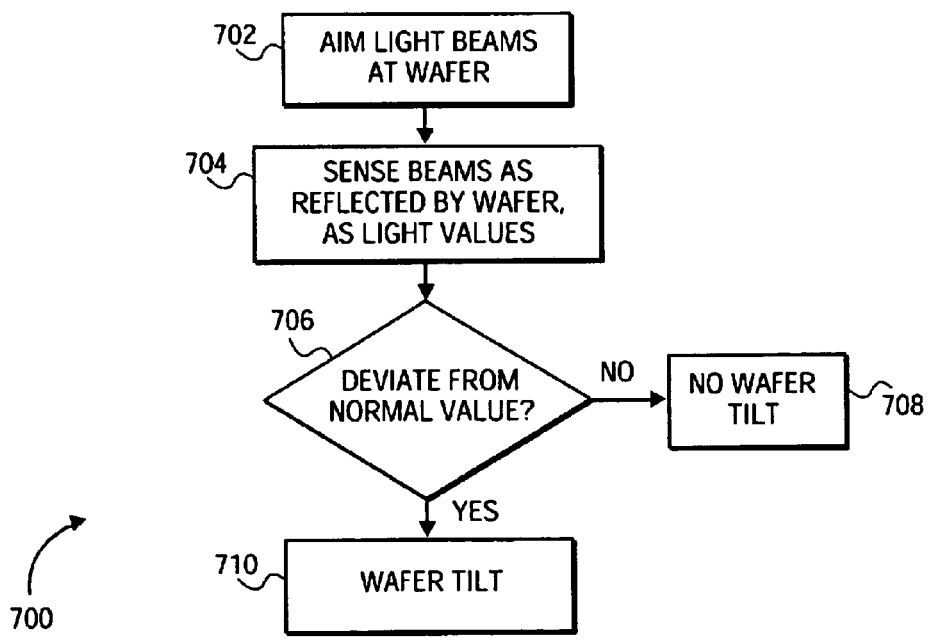
FIG. 7 is a flowchart of a method for monitoring semiconductor wafer tilt, according to an embodiment of the invention.

FIG. 7 shows a method 700 for monitoring semiconductor wafer tilt according to an embodiment of the invention. First, one or more light beams (or more generally light) are aimed at a semiconductor wafer (702), such as optionally via a beam splitter and/or a beam bender. These light beams, as reflected by the semiconductor wafer, are then sensed as one or more light values (704). If the light values deviate from a normal value (706), such as the absolute difference thereof deviating from a normal absolute difference, then this indicates that semiconductor wafer tilt has occurred (710) Deviation may be determined as outside plus or minus a tolerance value of the normal value or the normal absolute difference as well. However, if the light values do not deviate from the normal value (706), then this indicates that no semiconductor wafer tilt has occurred (708).

In one embodiment, the normal value and/or the normal absolute difference is obtained as follows. First, the semiconductor wafer is ensured not to be tilted. Next, the light beams are generated as aimed against the semiconductor wafer. The semiconductor wafer-reflected light beams are sensed by the light detectors as light values. These light values are used as the normal values, or subtracted absolutely to obtain the normal absolute difference. The tolerance value can then be set as desired, such as a percentage of the normal value or the normal absolute difference.

It is noted that, although specific embodiments have been illustrated and described herein, it will be appreciated by those of ordinary skill in the art that any arrangement is calculated to achieve the same purpose may be substituted for the specific embodiments shown. This application is intended to cover any adaptations or variations of the present invention. Therefore, it is manifestly intended that this invention be limited only by the claims and equivalents thereof.

What is claimed is:

1. A system for monitoring semiconductor wafer tilt of a semiconductor wafer comprising:

one or more light sources, each light source generating light reflected by the wafer, wherein the one or more light sources comprise only a single light source;

one or more light detectors, each light detector sensing a detected light value of the light reflected by the semiconductor wafer, wherein the one or more light detectors comprise only a pair of light detectors, where the detected light value deviating from a normal value corresponding to no wafer tilt indicates that the wafer has tilted; and a beam splitter to split the light generated by the single light source into a first light beam and a second light beam.

2. The system of claim 1, further comprising a beam bender to reflect the second light beam towards the semiconductor wafer.

3. The system of claim 1, wherein a first light detector of the pair of light detectors senses a first detected light value for the first light beam reflected by the semiconductor wafer, and a second light detector of the pair of light detectors senses a second detected light value for the second light beam reflected by the semiconductor wafer.

4. The system of claim 3, further comprising a comparator comparing the first detected light value and the second detected light value as an absolute difference, where the absolute difference deviating from a normal absolute difference corresponding to no wafer tilt indicates that the wafer has tilted.

5. The system of claim 1, wherein the one or more light detectors comprise only a single light detector.

6. The system of claim 5, wherein the one or more light sources comprise only a single light source.

7. The system of claim 1, wherein the detected light value deviating from the normal value corresponding to no wafer tilt by more than a tolerance value indicates that the wafer has tilted.

8. A system for monitoring semiconductor wafer tilt comprising:

a light source generating light reflected by the semiconductor wafer;

a pair of light detectors each sensing a detected light value of the light reflected by the semiconductor wafer;

a comparator to compare the detected light value sensed by each of the pair of light detectors as a wafer tilt value, where the wafer tilt value deviating from a normal value corresponding to no wafer tilt indicates that the wafer has tilted; and a beam splitter to split the light generated by the light source into a first light beam and a second light beam, a first of the pair of light detectors sensing the first light beam as reflected by the semiconductor wafer, and a second of the pair of light detectors sensing the second light beam as reflected by the semiconductor wafer.

9. The system of claim 8, further comprising a beam bender to reflect the second light beam towards the semiconductor wafer.

10. The system of claim 8, wherein the wafer tilt value deviating from the normal value corresponding to no wafer tilt by more than a tolerance value indicates that the wafer has tilted.

11. A method for monitoring semiconductor wafer tilt of a semiconductor wafer comprising:

aiming one light beam against a semiconductor wafer for reflection by the semiconductor wafer;

splitting said light beam into a first light beam and a second light beam;

sensing a first detected light value for the first light beam reflected by the semiconductor wafer by a first light detector, and sensing a second detecting light value for the second light beam reflecting by the semiconductor wafer by a second light detector; and determining that wafer tilt of the semiconductor wafer has occurred where the first detected light value and the second detected light value deviate from a normal value corresponding to no wafer tilt.

12. The method of claim 11, wherein determining that wafer tilt of the semiconductor wafer has occurred further comprises:

comparing the first detected light value to the second detected light value as an absolute difference; and determining that wafer tilt of the semiconductor wafer has occurred where the absolute difference deviates from a normal absolute difference.

13. The method of claim 12, wherein determining that wafer tilt of the semiconductor wafer has occurred where the absolute difference deviates from the normal absolute difference comprises determining that wafer tilt of the semiconductor wafer has occurred where the absolute difference deviates from the normal absolute by more than a tolerance value.

* * * * *